US008488301B2

(12) United States Patent
Wetherill et al.

(10) Patent No.: US 8,488,301 B2
(45) Date of Patent: Jul. 16, 2013

(54) ULTRACAPACITOR PACKAGE DESIGN HAVING SLIDEABLY ENGAGABLE BENT TABS

(75) Inventors: Todd Marshall Wetherill, Painted Post, NY (US); Kamjula Pattabhirami Reddy, Corning, NY (US)

(73) Assignee: Corning Incorporated, Corning, NY (US)

( * ) Notice: Subject to any disclaimer, the term of this patent is extended or adjusted under 35 U.S.C. 154(b) by 265 days.

(21) Appl. No.: 13/036,069

(22) Filed: Feb. 28, 2011

(65) Prior Publication Data
US 2012/0218680 A1 Aug. 30, 2012

(51) Int. Cl.
*H01G 9/00* (2006.01)
(52) U.S. Cl.
USPC .......................................... 361/502
(58) Field of Classification Search
USPC .......................................... 361/502
See application file for complete search history.

(56) References Cited

U.S. PATENT DOCUMENTS

| | | | |
|---|---|---|---|
| 2,928,888 A | 3/1960 | Vogt | |
| 3,174,085 A | 3/1965 | Schroeder, Jr. et al. | |
| 4,408,259 A | 10/1983 | Muranaka et al. | 361/434 |
| 4,827,380 A | 5/1989 | Watanabe et al. | |
| 5,093,762 A * | 3/1992 | Sato et al. | 361/502 |
| 5,450,279 A | 9/1995 | Yoshida et al. | 361/502 |
| 5,477,918 A | 12/1995 | Grulke et al. | 165/133 |
| 5,607,753 A | 3/1997 | Parks | 428/210 |
| 6,137,673 A | 10/2000 | Andou et al. | 361/502 |
| 6,414,838 B1 | 7/2002 | Oyama et al. | 361/511 |
| 6,433,997 B1 | 8/2002 | Noguchi et al. | 361/511 |
| 6,456,484 B1 * | 9/2002 | Matsuoka et al. | 361/511 |
| 6,493,209 B1 | 12/2002 | Kamath et al. | 361/502 |
| 6,534,212 B1 * | 3/2003 | Hooke | 429/94 |
| 6,552,895 B1 | 4/2003 | Vassallo et al. | 361/517 |
| 6,623,884 B1 | 9/2003 | Spillman et al. | 429/94 |
| 6,762,926 B1 | 7/2004 | Shiue et al. | 361/502 |
| 6,828,059 B2 | 12/2004 | Miller et al. | 429/94 |
| 7,014,948 B2 | 3/2006 | Lee et al. | 429/144 |
| 7,035,078 B1 | 4/2006 | Viavattine | 361/303 |
| 7,145,763 B2 | 12/2006 | Kim et al. | 261/502 |
| 7,273,678 B2 * | 9/2007 | Akita et al. | 429/211 |
| 7,318,980 B2 * | 1/2008 | Kim | 429/211 |
| 7,332,246 B2 * | 2/2008 | Wiepen | 429/211 |
| 7,511,941 B1 | 3/2009 | Gallay et al. | 361/502 |
| 2002/0182349 A1 | 12/2002 | Pynenburg | 428/35.3 |
| 2003/0044677 A1* | 3/2003 | Naruoka | 429/161 |

(Continued)

FOREIGN PATENT DOCUMENTS

| | | | |
|---|---|---|---|
| BE | 390454 | * | 8/1932 |
| FR | 2071615 | * | 12/2005 |

(Continued)

OTHER PUBLICATIONS

PCT/US2012/026020 Search Report.

*Primary Examiner* — David M Sinclair
(74) *Attorney, Agent, or Firm* — Michael W. Russell

(57) ABSTRACT

A terminal plate for an ultracapacitor package is formed from a single sheet of conductive material and comprising a plurality of bent tabs extending in a direction substantially orthogonal to a first main surface of the terminal plate. The terminal plate is configured to provide direct metallurgical contact between external terminals of the ultracapacitor package and the respective terminals of an electrode set that is incorporated into the package.

13 Claims, 4 Drawing Sheets

U.S. PATENT DOCUMENTS

| | | | |
|---|---|---|---|
| 2004/0090736 A1 | 5/2004 | Bendale et al. | 361/502 |
| 2005/0008933 A1 | 1/2005 | Ligeois et al. | 429/161 |
| 2006/0245144 A1* | 11/2006 | Hozumi et al. | 361/511 |
| 2007/0053140 A1 | 3/2007 | Soliz | 361/502 |
| 2008/0007892 A1 | 1/2008 | Miller | 361/502 |
| 2009/0180238 A1 | 7/2009 | Gallay et al. | 361/523 |
| 2009/0195965 A1 | 8/2009 | Fujimoto | |
| 2009/0303659 A1 | 12/2009 | Zhong et al. | 361/502 |
| 2010/0067173 A1 | 3/2010 | Guillet et al. | 361/502 |

FOREIGN PATENT DOCUMENTS

| | | | |
|---|---|---|---|
| JP | 3094410 A | | 4/1991 |
| JP | 03218616 A | * | 9/1991 |
| JP | 6188149 A | | 7/1994 |
| JP | 2000/0124080 | | 4/2000 |
| JP | 2000/0182895 | | 6/2000 |
| JP | 2000/0188237 | | 7/2000 |
| JP | 2000/0243670 | | 9/2000 |
| JP | 2000277154 A | * | 10/2000 |
| JP | 2003/0282377 | | 10/2003 |
| JP | 2005/0285615 | | 10/2005 |
| JP | 2007/0189127 | | 7/2007 |
| JP | 2010118374 A | * | 5/2010 |
| WO | 02/062910 | | 8/2002 |
| WO | 2006/064837 | | 6/2006 |

* cited by examiner

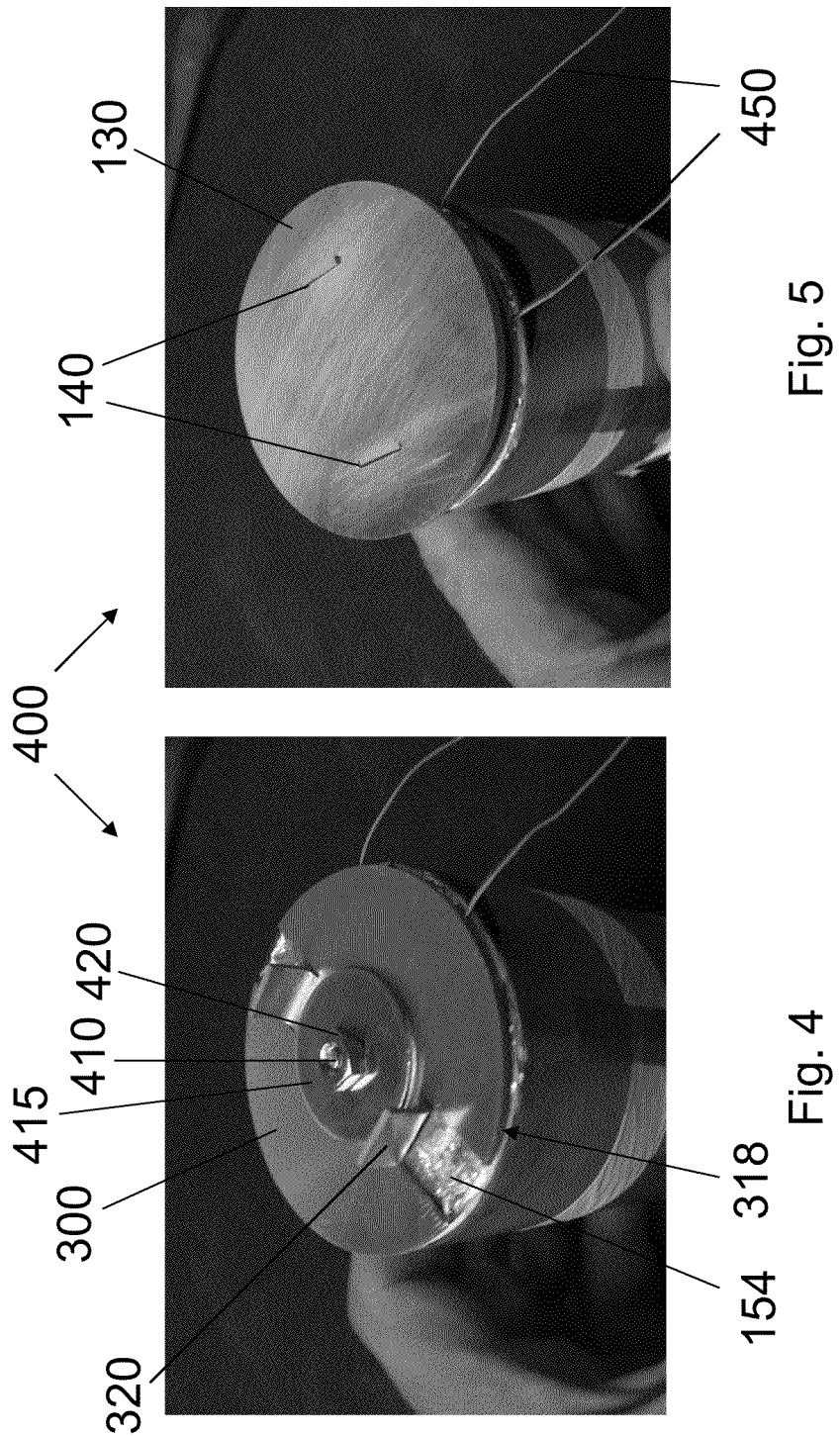

ULTRACAPACITOR PACKAGE DESIGN HAVING SLIDEABLY ENGAGABLE BENT TABS

FIELD OF THE DISCLOSURE

The disclosure relates to a low cost package design for electrochemical double layer capacitors, and more particularly to a terminal plate design for providing an all-metal, electrically-conductive path between the electrodes and the capacitor terminals in an EDLC.

BACKGROUND

Energy storage devices such as ultracapacitors may be used in a variety of applications where a discrete power pulse is required. Such applications range from cell phones to hybrid vehicles. Ultracapacitors can include two or more carbon-based electrodes separated by a porous separator and an organic electrolyte. The foregoing active components can be arranged in a variety of designs, which can include parallel plate and jellyroll configurations. The active components are contained within a housing or package.

Important characteristics of an ultracapacitor are the energy density and the power density that it can provide. The energy density and the power density are largely determined by the properties of the active components. A further important characteristic is cost. Factors that impact the cost of the device include the cost of the raw materials, as well as the direct and indirect costs of the associated packaging, which can impact performance, manufactureabilty and reliability. It is desirable to make an ultracapacitor package simple and inexpensive while simultaneously robust and efficient.

One aspect of an ultracapacitor package is the means by which internal electrical connections are made. Approaches for forming electrical connections between the active components of the device (e.g., jellyroll) and the package terminals include welding, crimping and interference fits. Conventional designs that utilize the foregoing approaches, however, can have issues with long-term performance and reliability.

In view of the foregoing, there is a need for a simple, economical and robust package design for ultracapacitors.

SUMMARY

The disclosure relates to a terminal plate for an ultracapacitor package. In an embodiment, the terminal plate is formed from a single sheet of conductive material and comprises a plurality of bent tabs extending in a common direction substantially orthogonal to a first main surface of the terminal plate.

An ultracapacitor package can include one or more terminal plates. In a further embodiment, an ultracapacitor package comprises a housing having an end wall that includes a first package terminal. The housing defines an interior volume that can be closed using an end cap that includes a second package terminal. An electrode set comprising first and second electrodes can be incorporated into the interior volume. First and second terminal plates can also be incorporated into the interior volume to provide an electrical connection between the capacitor electrodes and the package terminals. In an example configuration, a first main surface of a first terminal plate is in electrical contact with the first electrode, and bent tabs formed in the first terminal plate are in electrical contact with the first package terminal. In a similar manner, a first main surface of a second terminal plate is in electrical contact with the second electrode, and bent tabs formed in the second terminal plate are in electrical contact with the second package terminal.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

BRIEF DESCRIPTION OF THE DRAWINGS

The accompanying drawings are included to provide a further understanding of the invention, and are incorporated in and constitute a part of this specification. The drawings are not intended to be restrictive of the invention as claimed, but rather are provided to illustrate exemplary embodiments of the invention and, together with the description, serve to explain the principles of the invention.

FIG. 4 is an optical micrograph of a partially assembled test cell according to an embodiment; and FIG. 5 is an optical micrograph of a partially assembled test cell according to a further embodiment.

DETAILED DESCRIPTION

An ultracapacitor package includes a terminal plate that provides an all metallurgical connection along a current flow path between capacitor electrodes and the electrical terminals of the device. The terminal plate, which can improve the current density distribution and provide low resistance during charge/discharge cycles, is simple and economical to manufacture, and can be incorporated easily into the disclosed ultracapacitor package. The terminal plate and resulting ultracapacitor package can provide enhanced reliability with respect to conventional ultracapacitor packages.

Figure 1:
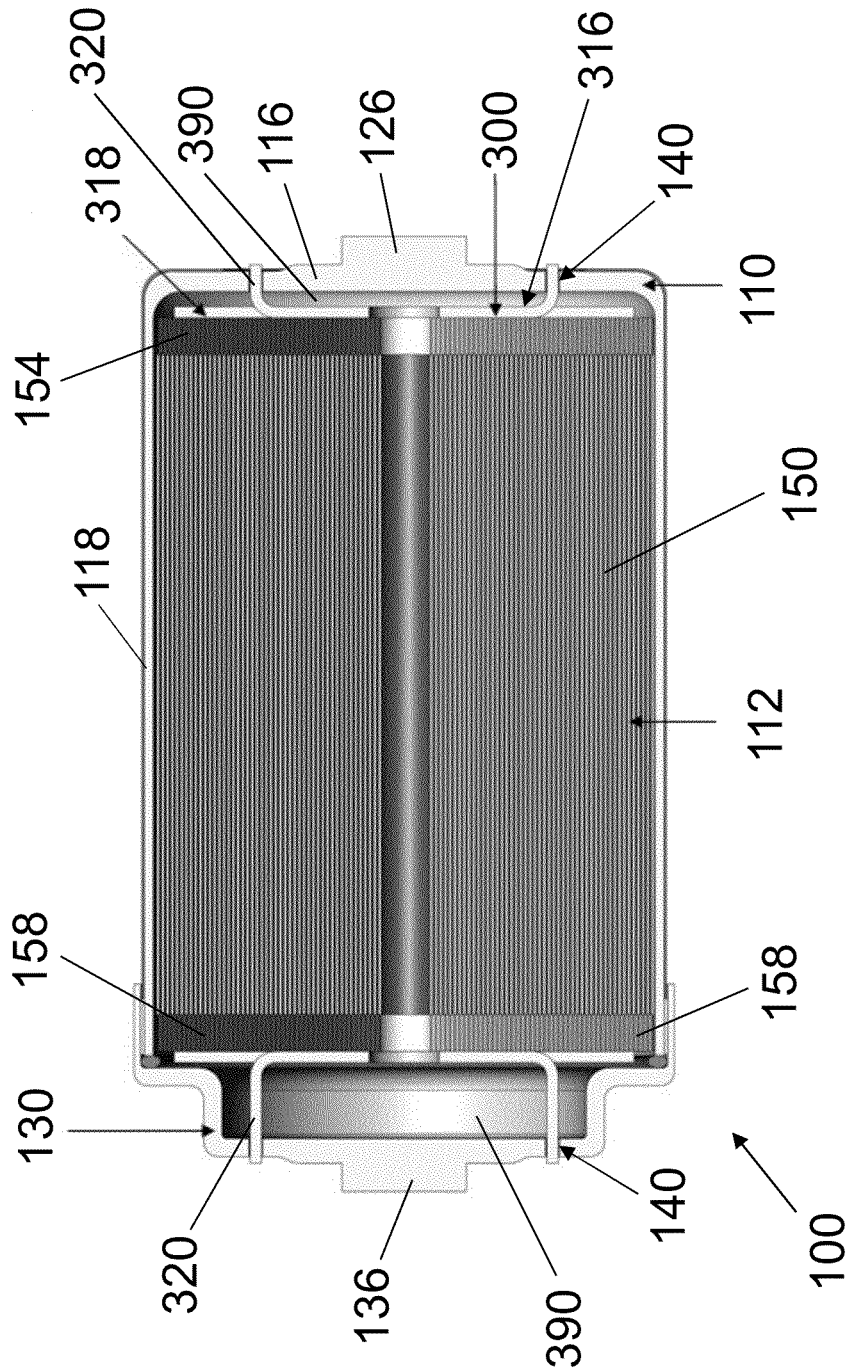
FIG. 1 is cross-sectional view of an example ultracapacitor package.

An example ultracapacitor package 100 is illustrated schematically in cross-section in FIG. 1. The ultracapacitor package 100 includes a housing 110 defining an interior volume 112. The housing 110 comprises an end wall 116, side walls 118, and an end cap 130 configured to sealably engage with the side walls 118 to enclose the interior volume 112. The end wall 116 and the end cap 130 comprise respective package terminals 126, 136. Conventional methods can be used to form the housing including, for example, impact extrusion.

An electrode set such as a jellyroll electrode set can be incorporated into the interior volume 112. In embodiments, the electrode set 150 can adopt a conventional construction comprising, for example, electrodes divided by at least one separator layer. Each of the electrodes can include a carbon-based layer formed over a conductive foil. As used herein, a layer that is "formed over" another layer will be in electrical contact but not necessarily in direct physical contact with the other layer.

In an example design, a pair of electrodes and two separator layers are stacked in an alternating manner and rolled along an axis into a "jelly-roll" cylinder. Once formed, the jelly-roll can have, for example, a circular or an oval cross section. Prior to rolling, the electrodes can be configured and arranged such that portions of each respective conductive foil extend beyond the other components of the electrode set in opposite directions to form first and second capacitor terminals 154, 158. Thus, when the electrodes and the separators are rolled, the capacitor terminals 154, 158 at opposing ends of the cylinder provide a means to connect the resulting jellyroll capacitor to the package terminals 126, 136. In some designs, the extended portions of each conductive foil can be pressed or matted together to facilitate robust electrical connections.

The jellyroll can be formed by coiling the stack of materials around a mandrel. The mandrel, if used, can be removed after the jellyroll is formed, or left in place to function as, for example, a heat sink in the capacitor during operation.

In embodiments, the conductive foil can comprise any conductive material suitable for use in an electrochemical double layer capacitor. In one aspect, at least one of the conductive foils comprises a flexible conductive material that can be, for example, folded, rolled, or coiled. The conductive foil can be made from a metal such as, for example, aluminum.

The carbon-based layer can increase the surface area of the electrode set, and can include porous carbon or activated carbon. In various embodiments, one or both of the electrodes comprise activated carbon.

The separator layer can be a porous layer that allows a liquid electrolyte to permeate and/or diffuse there through. For example, the separator layer(s) can comprise paper, mica, glass, ceramic, aerogel, silica, non-conductive carbon, polymeric material, or a combination thereof.

Further details describing the electrode set, including the conductive foil, carbon layers, separator layers and liquid electrolyte are disclosed in commonly-owned US Patent Application Nos. 2010/0306979 and 2009/0320253, the entire contents of which are hereby incorporated by reference.

A terminal plate 300 can provide electrical contact between the capacitor terminals 154, 158 and the respective package terminals 126, 136. Together with the electrode set 150, a terminal plate 300 can be incorporated into the interior volume 112 of package 100 such that one surface 318 of the terminal plate makes physical and electrical contact with a capacitor terminal 154 or 158 while one or more bent tabs 320 that extend from the opposing surface 316 make physical and electrical contact with either the end wall 116 or the end cap 130 of the package, and thus provides an electrical connection to package terminals 126, 136. A single terminal plate can be incorporated at either end of the housing, or a package can comprise a pair of terminal plates.

Figure 2:
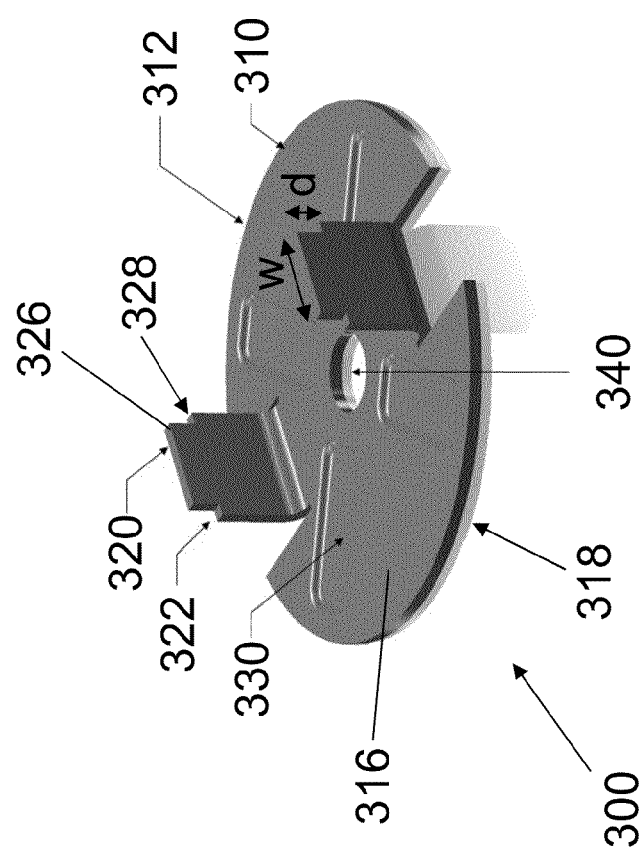
FIG. 2 is a perspective view of a terminal plate according to an embodiment.

A detailed view of a terminal plate according to one embodiment is shown in FIG. 2. The terminal plate 300 comprises a plate body 310 defined by a perimeter edge 312 and having substantially parallel opposing main surfaces 316, 318. A plurality of bent tabs 320 can be formed in the terminal plate 300. In the illustrated embodiment, a pair of tabs is bent to extend in a common direction substantially orthogonal to main face 316. In alternate embodiments, the terminal plate can have three or more bent tabs, which can be adapted to engage with a like number of slots formed in an end cap or end wall.

Optionally, each bent tab can include a pair of positioning notches 322, which can provide a self-fixturing stop that can position a terminal plate with respect to the end wall 116 or end cap 130 of the package 100. The positioning notches can limit the extent to which a bent tab passes through a slot to less than 0.1 inch (e.g., less than 0.1 or less than 0.05 inch).

Thinned regions 330 can be formed in the plate body 310 to enable welding (e.g., laser welding) of a main surface 318 to terminals 154, 158. The thinned regions 330 can be formed by coining a main surface. In embodiments, the thinned regions 330 are formed in a main surface 316 opposite to a main surface 318 where the terminal plate contacts terminals 154, 158.

The terminal plate can optionally be provided with a center hole 340. The center hole 340 can be used to enable electrolyte filling of the ultracapacitor package. A center hole forms an open dead space that may serve as a gas generation buffer, and allows the use of a rod or mandrel during assembly to hold each terminal plate 300 in contact with the capacitor terminals 154 and/or 158 during welding.

The terminal plate, which comprises a unitary part, can be formed from a sheet of conductive material using any suitable method, including stamping, laser cutting, water jet cutting, coining, etc. In embodiments, a thickness of the terminal plate can range from 0.01 inch to 0.1 inch, where a thickness of the thinned regions can range from 0.005 to 0.05 inch. By way of example, thinned regions 330 of the terminal plate can have a thickness ranging from 25% to 75% (e.g., 50%) of the original terminal plate thickness.

In ultracapacitors comprising a pair of terminal plates, the design of each terminal plate may be substantially identical, or the terminal plates may be different. In an embodiment, one terminal plate may have longer bent tabs, which can cooperate with an extended end cap or an extended end wall to form a dead gas volume within the assembled housing.

Figure 3:
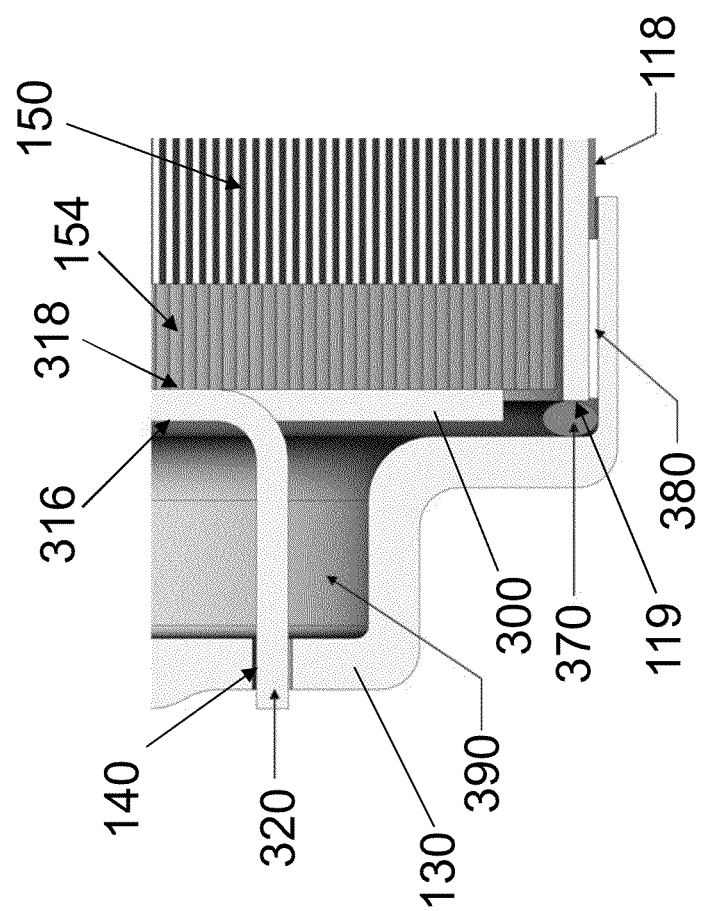
FIG. 3 is a detailed cross-sectional view of an example ultracapacitor package.

According to further embodiments, end wall 116 and end cap 130 of housing 110 can independently comprise slots 140 that are configured to slideably engage with the bent tabs. A detailed view of one end of an example ultracapacitor package 100 is illustrated in FIG. 3. Terminal 154 of a jelly roll electrode set 150 is welded to surface 318 of terminal plate 300 and inserted into interior volume 112. Bent tabs 320 extend through slots 140 formed in the end cap 130 and optionally protrude slightly. A hermetic and direct metallurgical joint is formed between terminal 154 and the end cap 130 by welding the bent tabs 320 to the end cap 130 where the bent tabs pass through slots 140. The welding can comprise autogenous gas tungsten arc welding (GTAW), for example. A similar configuration can be formed at the opposite end (e.g., at the end wall 116) of the package 100.

In contrast with conventional assemblies, which use interference fits between parts in the electrical conductive paths, a welded fit has improved dimensional stability, greater mechanical robustness and, due to the hermetic nature of the weld joint, can provide enhanced resistance to interior corrosion and precipitation of salts from the electrolyte. Advantageously, the all metallurgical connection provided by the terminal plate can significantly lower the electrical resistance between the electrode set and the package terminals.

Thermal modeling and experimental testing were performed in order to assess the distribution of temperatures during welding. Excess heat may damage the jelly roll. Under welding conditions of 12 volts and 60 amps for 5 seconds, the modeling predicted a maximum temperature of 110° C. in the vicinity of the jelly roll, which is within acceptable range for the device.

FIGS. 4 and 5 show a test device 400. In FIG. 4, a terminal plate 300 abuts capacitor terminal 154 and the terminal plate is secured against the terminal 154 using a threaded tie rod 410, washer 415, and nut 420. The plurality of portions of the conductive foil that form terminal 154 have been matted to provide a more robust interface between the terminal 154 and a main surface 318 of the terminal plate.

The terminal plate includes a pair of bent tabs 320. Thermocouples 450 are positioned between the terminal plate 300 and the jelly roll terminal 154 in order to measure a local temperature during welding. As seen with reference to FIG. 5, a simulated end cap 130 having a pair of slots 140 is placed over the terminal plate 300 such that the bent tabs 320 extend through respective slots. The bent tabs pass through the slots and extend by approximately 0.03 inch.

The bent tabs are welded (e.g., gas tungsten arc welded) within the slots of the simulated end cap at welding conditions of 12 volts and 65 amps, which produced a measured temperature of 120° C. Helium leak testing confirmed that the weld joints are hermetic.

In an embodiment, bent tabs 320 can optionally include positioning notches 322 that are configured to limit the extent that the bent tabs engage with slots 140. With reference again to FIG. 2, a bent tab having positioning notches 322 has an engagement segment 326 having a width w and depth d. A thickness of the engagement segment can be the same as the thickness of the bent tab, which can be the same as the thickness of the plate body 310 from which it was bent. A bent tab having such an engagement segment may slideably engage with a slot 140 having length and width dimensions slightly greater than wxd, where the bent tab will slide through such a slot only to a depth d whereupon a step 328 formed by notch 322 will engage with the body in which the slot is formed and seat the bent tab within the slot.

Positioning notches can be used to spatially offset an end cap or end wall away from the plate body 310 such that, in embodiments, a dead space 390 is formed between main surface 316 and an inner surface of the end cap or end wall. In embodiments, electrical contact between the terminal plate and the end cap or end wall is made only via bent tabs 320, i.e., the plate body 310 does not make contact with an end cap 130 or end wall 116. In addition to locating the fit between the terminal plate and the housing, the positioning notches can absorb external loads that would otherwise impact and potentially damage the weld joints.

A hermetic seal can be formed between the end cap 130 and the side walls 118 of the housing 110 in order to protect the contents of the housing from exposure to air or moisture, as well as to electrically isolate the end cap 136 (and the corresponding package terminal 136) from the opposing end wall 116 (and the corresponding package terminal 126).

A variety of approaches can be used to provide both hermetic sealing and electrical isolation between the end cap and the housing. Such approaches include the use of insulators, coatings, and polymer seals including O-rings.

The end cap joint can incorporate an O-ring 370 that can be positioned, for example between housing 110 and an inner surface of end cap 130 to provide a sealed interface. In an example embodiment, as illustrated in FIG. 4, an O-ring 370 can be incorporated as a face seal that engages housing 110 at an end face 119 of sidewall 118. Example O-rings can have a high electrical resistance, and can be formed using a low carbon material.

In further embodiments, an adhesive seal can be used to electrically isolate the end cap from the housing, and hermetically seal the package against the ingress of air and/or moisture as well as prevent leakage of the liquid electrolyte. Tests have suggested that an adhesive seal can provide a more robust hermetic barrier than conventional polymer O-rings. For example, an epoxy resin could be used to seal the joint, and also to electrically isolate the housing from the end cap. An example epoxy is Loctite (Henkel, Dusseldorf, Germany).

An adhesive seal 380, which can be used in addition to or in lieu of an O-ring, can be formed along a narrow interface between an outer surface of sidewall 118 and an inner surface of end cap 130.

The disclosed ultracapacitor package includes low cost piece parts that are simple to assemble and which, when assembled, provide a low cost, robust and reliable package.

As used herein, the singular forms "a," "an" and "the" include plural referents unless the context clearly dictates otherwise. Thus, for example, reference to a "metal" includes examples having two or more such "metals" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A terminal plate for an ultracapacitor package, the terminal plate being formed from a single sheet of conductive material and comprising:

a plurality of bent tabs extending in a common direction substantially orthogonal to a first main surface of the terminal plate, wherein the bent tabs are adapted to be slideably engageable with respective slots formed in an end wall and an end cap of an ultracapacitor housing such that steps defined by positioning notches formed in the bent tabs abut surfaces of the end wall and the end cap so that portions of the bent tabs extend through the notches by at most 0.1 inch.

2. The terminal plate according to claim 1, wherein the terminal plate has a substantially circular cross section.

3. The terminal plate according to claim 1, wherein the terminal plate comprises a pair of bent tabs.

4. The terminal plate according to claim 1, wherein the terminal plate comprises three bent tabs.

5. The terminal plate according to claim 1, wherein the bent tabs include a plurality of positioning notches.

6. The terminal plate according to claim 1, wherein a thickness of the sheet ranges from 0.01 to 0.1 inch.

7. The terminal plate according to claim 1, wherein the first main face of the terminal plate comprises one or more thinned regions.

8. The terminal plate according to claim 1, wherein the first main face of the terminal plate comprises one or more thinned regions having a thickness from 0.005 to 0.05 inch.

9. The terminal plate according to claim 1, further comprising a hole formed in a central portion of the sheet.

10. An ultracapacitor package comprising:
   a housing having an end wall comprising a first package terminal, said housing defining an interior volume;
   an end cap comprising a second package terminal and engaged with the housing to enclose the interior volume;
   an electrode set incorporated into the interior volume, the electrode set comprising first and second electrodes;
   first and second terminal plates each being formed from a single sheet of conductive material, said terminal plates including a respective plurality of bent tabs extending in a direction substantially orthogonal to a main face of each terminal plate, wherein
   a first main surface of the first terminal plate is in electrical contact with the first electrode,
   the bent tabs of the first terminal plate are in electrical contact with the first package terminal;
   a first main surface of the second terminal plate is in electrical contact with the second electrode;
   the bent tabs of the second terminal plate are in electrical contact with the second package terminal; and
   the bent tabs of the first and second terminal plates are slideably engaged with respective slots formed in the end wall and in the end cap such that steps defined by positioning notches formed in the bent tabs abut surfaces of the end wall and the end cap so that portions of the bent tabs extend through the notches by at most 0.1 inch.

11. The ultracapacitor package according to claim 10, wherein the first main surface of the first terminal plate is welded to the first electrode and the first main surface of the second terminal plate is welded to the second electrode.

12. The ultracapacitor package according to claim 10, wherein the first main surface of the first terminal plate is welded to the first electrode at one or more thinned portions of the first main surface of the first terminal plate and the first main surface of the second terminal plate is welded to the second electrode at one or more thinned portions of the first main surface of the second terminal plate.

13. The ultracapacitor package according to claim 10, wherein the bent tabs of the first and second terminal plates are slideably engaged with and hermetically welded within respective slots formed in the end wall and in the end cap.

\* \* \* \* \*